Dec. 16, 1958 J. R. WEST 2,864,224
HARVESTING MACHINE
Filed July 5, 1957 3 Sheets-Sheet 1

INVENTOR
JAMES R. WEST
ATTORNEY

Dec. 16, 1958 J. R. WEST 2,864,224
HARVESTING MACHINE
Filed July 5, 1957 3 Sheets-Sheet 2

INVENTOR
JAMES R. WEST
ATTORNEY

Dec. 16, 1958          J. R. WEST          2,864,224

HARVESTING MACHINE

Filed July 5, 1957          3 Sheets-Sheet 3

INVENTOR
JAMES R. WEST
ATTORNEY

2,864,224

HARVESTING MACHINE

James R. West, New Holland, Pa., assignor to Sperry Rand Corporation, New Holland, Pa., a corporation of Delaware Application July 5, 1957, Serial No. 670,133

10 Claims. (Cl. 56—2)

This invention relates to improvements in a header for a forage harvester such as commonly is used for agricultural purposes, and more importantly, the invention relates to means for attaching an agricultural header to a forage harvester.

Agricultural forage harvesters are used very extensively for purposes of chopping various types of forage material to render the same capable of being placed in storage, for example, such as in a silo. Depending upon the type of forage being harvested, different types of header or other cutting and harvesting units or mechanisms are attached respectively to the forward end of a standard forage harvester for example, thereby rendering the harvester useful to cut and feed a specific type of forage crop to the chopping mechanism of the forage harvester.

In addition to harvesting such conventional silo crops as corn and sorghum by means of a corn harvester attached to a basic forage harvester containing the chopping mechanism, it now is common practice to harvest a number of other crops in green condition, chop the same, and store it in a silo, rather than cut, dry, and bale the same as previously was frequently done. In regard to the latter, grass, alfalfa, clover, and similar forage crops now frequently are harvested by an appropriate header attached to the basic forage harvester which operates to chop the cut forage crops fed to the chopping mechanism. After said forage crops are chopped, they usually are discharged into a wagon as the forage harvester moves through a field, following which the chopped material is either conveyed or blown into a silo from the wagon.

The substitution of one type of crop cutting header for another on a forage harvester presents certain problems. Such headers usually are of substantial size and weight, whereby removing such headers from the basic forage harvester and attaching the same thereto requires considerable manual force and, in addition, said headers frequently are cumbersome and awkward to handle.

It is the principal object of the present invention to provide in an agricultural forage harvester and a header to be attached thereto interfitting and interengageable portions which are so designed as to render the connection of the same together much easier to accomplish than has been possible heretofore.

Another object of the invention is to provide on the header and forage harvester cam means which facilitate the centering of the header relative to the harvester while the same are being connected together, thus saving time and energy required to effect the connection of these elements in comparison with the connection of structures used heretofore.

A further object of the invention is to provide quickly operable, toggle-type latching means which secure the header to the forage harvester after the two have been centered and otherwise disposed in abutting engagement with each other.

Details of the foregoing objects and of the invention, as well as other objects thereof, are set forth in the following specification and illustrated in the drawings comprising a part thereof.

Figure 1:
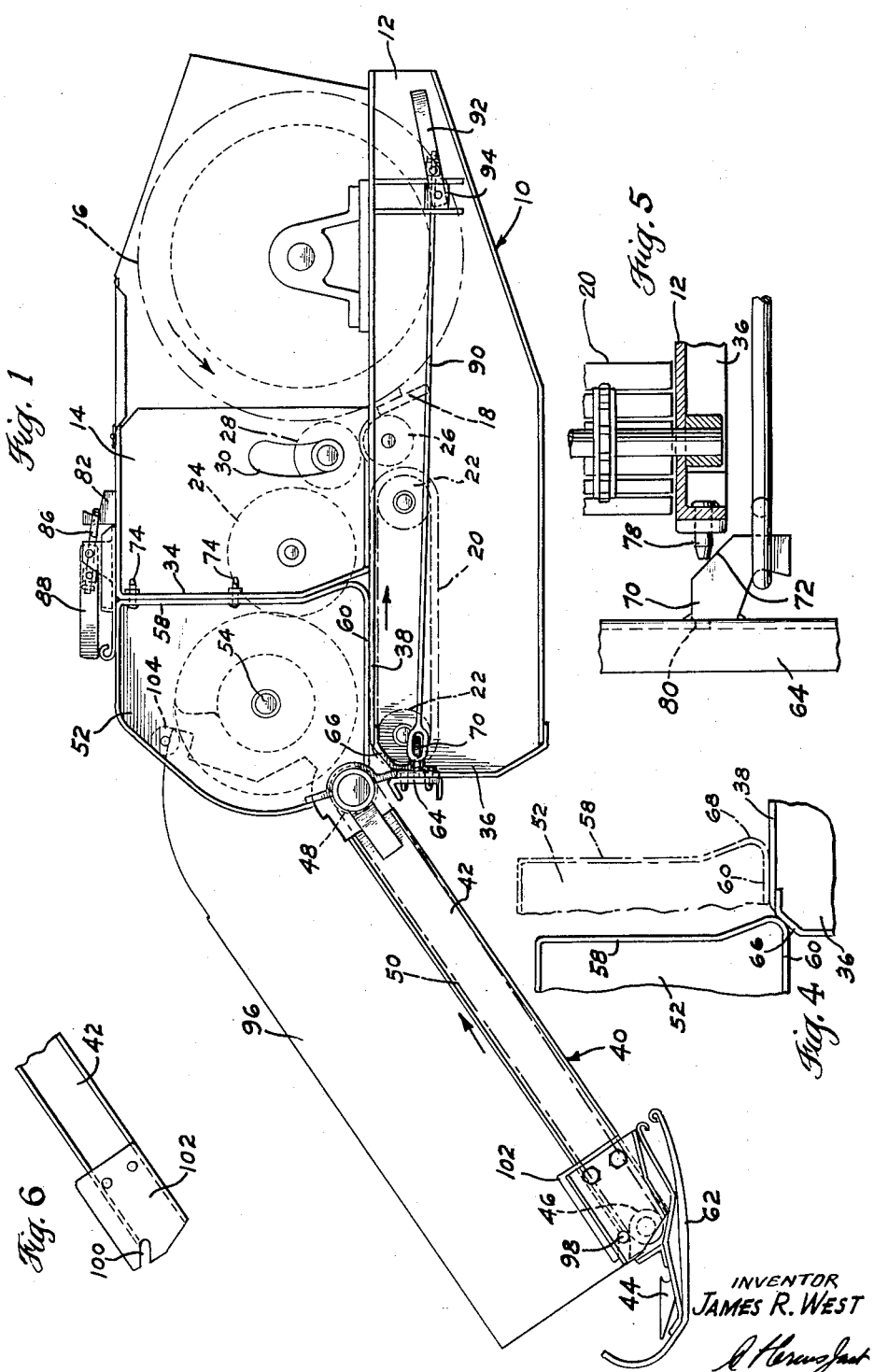
Fig. 1 is a side elevation of an exemplary header and forage harvester illustrated in connected position and showing the improvements comprising the present invention for effecting such connection. In this view, certain portions of the forage harvester such as the wheel supports and driving mechanism for the harvester have been omitted in order to simplify the illustration.
Figure 3:
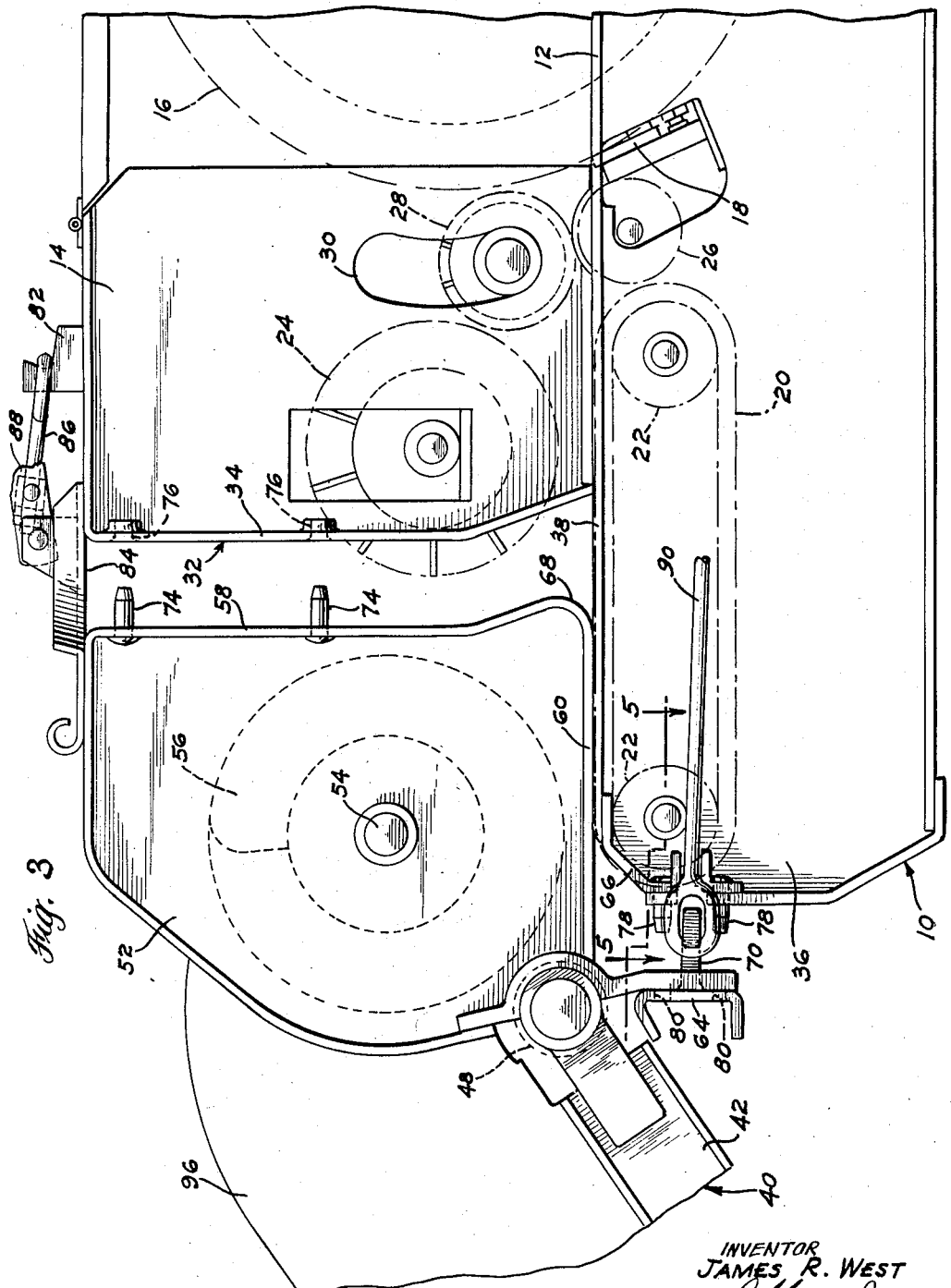

Fig. 3 is an enlarged fragmentary side elevation illustrating in greater detail than in Fig. 1 the connecting means for securing the rearward end of the header to the forward end of the forage harvester in accordance with the present invention, said view illustrating the rearward end of the header in process of being connected to the forward end of the harvester, particularly for purposes of illustrating the functioning of the aligning means embodied in the invention.

Fig. 4 is a fragmentary side elevation illustrating the operation of cam means by which the positioning of the rearward end of the header relative to the forward end of the harvester in a vertical direction is facilitated, an exemplary initial position of the same being illustrated in full lines, while in dotted lines, the final relative vertical position of the members is shown.

Fig. 5 is an enlarged fragmentary plan view taken on the line 5—5 of Fig. 3 and showing, partly in section, co-engaging portions of the header and harvester and illustrating the functioning of certain of the cam means to effect transverse alignment of the header relative to the harvester during the connection of the same together.

Fig. 6 is a fragmentary side elevation of the lower end of one element of the header adjacent the cutter bar thereof and illustrating a detail of construction.

The present invention principally relates to constructions in the header and forage harvester which facilitate the attachment of the same together. Hence, certain details of both the header and harvester have been omitted from the drawings comprising a part of this application. However, for further details of both of these elements, attention is directed to co-pending application Serial No. 453,902, filed September 2, 1954, now Patent No. 2,800,217 and assigned to the assignee of the present invention.

Figure 2:
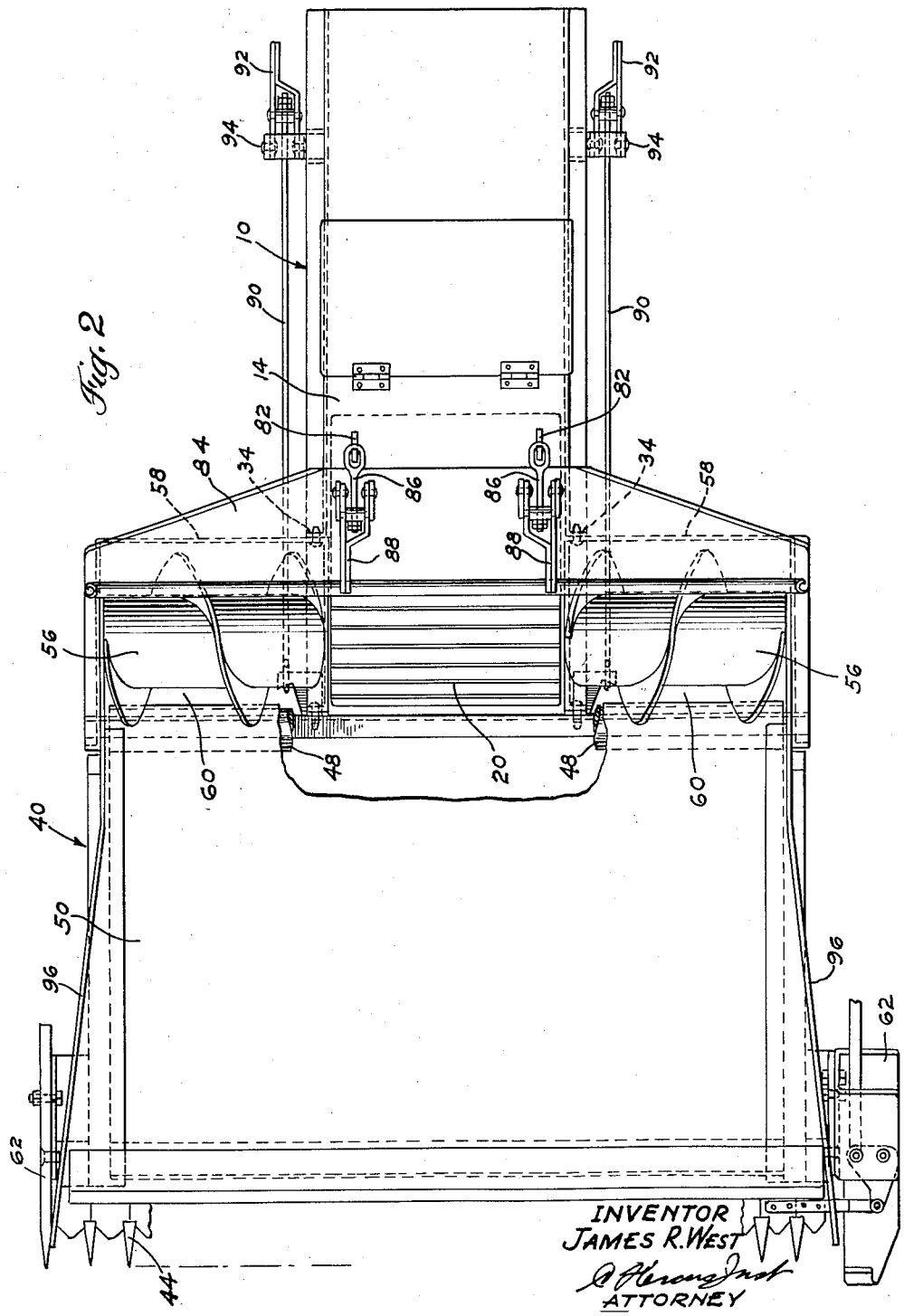
Fig. 2 is a top plan view of the connected header and forage harvester illustrated in Fig. 1 with portions broken away.

Referring to the drawings, and particularly Figs. 1 and 2, the forage harvester 10 comprises a frame 12 upon which a housing 14 is mounted. The frame 12 supports rotatably a drum-type chopper 16 of convention structure which has a plurality of blades thereon cooperating with shear bar 18. An infeed belt 20 is supported by a plurality of parallel rollers 22 for movement of the belt 20 in the direction of the arrow shown in Fig. 1.

A rotatable pressure roll 24 is supported for cooperation with the upper course of belt 20 to insure feeding of silage material to the cooperating rollers 26 and 28, the ends of the upper roller 28 being supported in arcuate slots 30. The silage material is fed between the rollers 26 and 28 to the chopper 16 and shear bar 18. The chopper 16, belt 20, and certain of the rolls are driven by power means in accordance with conventional practice, said power means not being illustrated.

The chopper and feeding mechanism described above primarily is contained within housing 14, the forward face 32 of which is open. Projecting laterally outward from the forward ends of the sides of housing 14 are lateral flanges 34 for purposes to be described. Also, the forward end 36 of frame 12 projects forwardly beyond the forward face 32 of housing 14, said forward end 36 of the frame having horizontal flanges 38 comprising slidably engageable supporting surfaces for purposes to be described.

The exemplary header 40 projects forwardly and downwardly from the forward end of the forage harvester 10 and is detachably connected to the forward end of the harvester 10 by means to be described. The header 40 comprises side frame members 42, the lower, forward ends of which support a cutter bar construction 44 of conventional type. Frame members 42 also support at opposite ends thereof a pair of parallel rollers 46 and 48, around which a flexible feed apron 50 extends.

Connected to the upper ends of the frame members 42 are a pair of opposite side plates 52, between which a shaft 54 extends. As is evident from Fig. 2 particularly, the header 40 is substantially wider than the forage harvester 10 and the open forward face 32 of the header, which extends between the flanges 34 shown in Fig. 2, likewise is substantially narrower than the header 40. Accordingly, the shaft 54 supports a pair of augers 56 which, during operation of the harvester, are rotated by power means, not illustrated, in accordance with conventional practice. The augers 56 have spiral blades of well known type therein which serve to move cut forage material from the outer edges of the feed apron 50 toward the center thereof so as to dispose the same upon infeed belt 20 which, in turn, feeds the forage material to the chopper drum 16.

The rearward end of the header 40 comprises vertical plates 58, the inner vertical edges of which are spaced to define an opening substantially the same as the forward open face 32 of harvester 10, as is clearly shown in Fig. 2. The laterally projecting portions of the rearward end of the header which enclose the augers 56 also comprise horizontal bottom plates 60, the inner ends of which slidably abut the upper surfaces of horizontal flanges 38 at the forward end of harvester 10 so as to support the rearward end of header 40 against downward vertical movement relative to harvester 10.

The lower end of the header 40 is supported in use by any suitable means such as skids 62 mounted at opposite sides of the forward end of the header, in accordance with conventional practice. A horizontal supporting bar 64 also is fixed to header 40 and extends transversely between the opposite side frame members 42 of the header for purposes of abutting the front face of forward end 36 of frame 12.

To facilitate the initial engagement of the upper rearward end of header 40 with the projecting forward end 36 of forage harvester 10, the forward upper corners of the end 36 of frame 12 are sloped as shown particularly in Fig. 3, to provide cam means 66 which are engageable by the preferably rounded lower rearward corners 68 on header 40 which comprise the junction of horizontal bottom plates 60 and vertical plates 58 of said header. Said lower rearward corners 68 also actually comprise cam means cooperable with the cam means 66 on harvester 10, whereby rearward movement of the upper end of header 40 to connect the same to harvester 10 initially results in coengagement of cam means 66 and 68 so as readily to dispose the horizontal bottom plate 60 in position to be moved slidably along the horizontal flanges 38 on the frame 12 of the harvester. Such rearward movement is continued until the vertical plates 58 are brought into proximity of the forward face 32 of harvester 10. It thus will be seen that cam means 66 and 68 operate to center the rearward end of header 40 in a vertical direction relative to the harvester 10. Projecting rearwardly from supporting bar 64 on header 40, adjacent the opposite ends thereof, are a pair of hook-like members 70 which project rearwardly, as best shown in Fig. 5. The inner edges 72 of the members 70 are beveled as shown in Fig. 5 for purposes of affording cam means engageable with the forward ends of frame 12, it being understood that the inner edges 72 are beveled in opposite directions respectively on the members 70 at opposite sides of header 40, whereby immediately preceding the abutment of the vertical plates 58 with lateral flanges 34, the upper, rearward end of the header 40 will be centered laterally, in a horizontal direction, relative to the harvester 10.

Additional means also are provided for aligning and also maintaining in alignment the upper rearward end of header 40 relative to the forward end of harvester 10. Such means comprise a plurality of guide pins 74 which preferably have tapered outer ends as clearly shown in Fig. 3, for reception within holes 76 formed in lateral flanges 34. The guide pins 74 preferably are fixed to the vertical plates 58 adjacent the inner edges thereof and the outer ends of holes 76 preferably are flared as shown in dotted lines in Fig. 3.

Preferably, additional guide pins 78 also are fixed to the forward end 36 of frame 12 so as to project forwardly therefrom as best shown in Fig. 3. Vertically aligned pairs of the guide pins 78 are mounted adjacent opposite sides of the frame 12 respectively for reception within the guide holes 80 formed within supporting bar 64. Hence guide pins 78 and guide holes 80 cooperate with guide pins 74 and holes 76 to maintain the rearward end of header 40 accurately aligned with the forward end of harvester 10 after the complementary abutting portions of the header and harvester have been brought into abutting relationship with each other. Prior to the engagement of the various guide pins with the holes therefor however, the cam means 66 and 68 have aligned the rearward end of the header relative to the forward end of the harvester in a vertical direction, while the cam means 72 have aligned the same in a transverse direction. To facilitate such prior alignment of the header and harvester by said cam means, the guide pins 74 and 78 preferably are relatively short so as to permit the cam means to function prior to the reception of said guide pins within the holes provided therefor.

In order to secure the header 40 detachably to the harvester 10 after the complementary abutting portions thereof have been brought into engagement with each other and the various guide pins have been received within the holes therefor, the present invention contemplates the use of quickly operable attaching means which not only secure the header to the harvester detachably but also facilitate the co-engagement of the abutting portions thereof together, especially after initial engagement of bottom plate 60 of the header has been made with the horizontal flanges 38 of the harvester, whereby the rearward end of the header is initially supported by the forward end of the harvester. The preferred embodiment of such connecting means is illustrated in Figs. 1 through 3 and comprises, in addition to the hook-like members 70 on header 40, additional hook-like members 82 connected to the top of housing 14 of harvester 10. Projecting rearwardly from the top of the rearward end of header 40 is a horizontal plate 84 which overlies and slidably engages the top of housing 14 of harvester 10. Carried by the plate 84 is a plurality of similar toggle-like latch members 86 having pivotally supported operating levers 88. The latch members 86 have loops therein which respectively receive the hook-like members 82, whereby when the operating levers 88 are moved upwardly and forwardly, the toggle construction thereof operates to move the header rearwardly into abutting relationship with the housing 14 of the harvester 10. After the levers 88 have been moved completely forwardly as shown in Fig. 1, the centers of the pivots will be past dead-center and therefore will securely but quickly detachably connect the header to the harvester. Additional connecting means also comprise a pair of tension rods 90, the forward ends of which have loops which receive the hook-like members 70, it being understood that one such tension rod 90 will be mounted adjacent the outer surface of each side of the frame 12. The rearward ends of the tension rods 90 are connected to a toggle-type latching lever 92 movable about a pivot 94, whereby when the levers 92 at opposite sides of the frame 12 are moved clockwise, the tension rods 90 will be moved rearwardly to securely clamp the supporting bar 64 on header 40 tightly against the forward end 36 of frame 12. Preferably, the distance between the various pivots of the toggle-type levers 88 and 92 of the latching means is sufficient to provide substantial movement of the loops on the latching members 86 and tension rods 90 that the operation of the toggle means will serve effectively to forceably move the header rearwardly so as to effect lateral centering of the header relative to the harvester through the operation of cam means 72 and also cause reception of the various guide pins 74 and 78 within the holes therefor.

Upon moving the latching levers 84 clockwise and latching levers 92 counter-clockwise, the latching members may be disconnected from the hook-like means, thereby permitting ready disengagement of the header 40 from the forage harvester 10 simply by pulling the header 40 forwardly from the forward end of harvester 10.

The header 40 also preferably includes side plates 96 connected to the side frame members 42 to prevent forage material being moved upwardly by feed apron 50 from spilling from the sides. The side plates 96 may be quickly and effectively connected to frame members 42 by means of pins 98 which are fixed to the side plates and are received within slots 100 formed in bracket plates 102 fixed to the lower ends of frame members 42, as shown in Figs. 1 and 6. The upper ends of plates 96 may be affixed against the inner surfaces of side plates 52 by any suitable bolt and washer means 104.

From the foregoing, it will be seen that the present invention provides simple and relatively inexpensive means for effecting initial vertical positioning of the rearward end of a header relative to the forward end of a forage harvester, as well as additional means for effecting centering of the header relative to the harvester in a transverse direction, aligning pins also being provided to maintain the complementary co-engaging portions of the header and harvester against lateral and vertical displacement when the header and harvester are connected together, and finally, quickly operable connecting latch means are provided to maintain the header detachably connected to the harvester. Hence, rapid mounting and dismounting of a header relative to a harvester now is possible by use of the present invention, much less manual effort now being required than when connecting a header to a harvester by presently used means.

While the invention has been described and illustrated in its several preferred embodiments, and has included certain details, it should be understood that the invention is not to be limited to the precise details herein illustrated and described, since the same may be carried out in other ways falling within the scope of the invention as claimed.

I claim:

1. An agricultural forager provided with chopping means within a housing having an open forward end, in combination with a header constructed and arranged to be connected firmly and detachably to the forward end of said forager and extend forwardly therefrom, the rearward end of said header and forward end of said forager housing having laterally extending flanges comprising complementary face portions arranged to abut each other when connected and also having interengageable cam and cam engageable means at opposite sides operable to engage each other and center said header in a horizontal direction relative to said forward end of said housing during movement of said header rearwardly toward said housing to connect the same thereto, and quickly disengageable connecting means on said header and housing operable to hold the same connected together when centered and abutting each other.

2. An agricultural forager provided with chopping means within a housing having an open forward end, in combination with a header constructed and arranged to be connected firmly and detachably to the forward end of said forager and extend forwardly therefrom, the rearward end of said header and forward end of said forager housing having complementary face portions arranged to abut each other when connected, interengageable cam and cam engageable means on opposite sides of said header and housing operable to center the rearward end of said header in both vertical and horizontal directions relative to said forward end of said housing when said header is moved rearwardly toward said housing to connect the same thereto, and quickly disengageable connecting means on said header and housing operable to hold the same connected together when centered and abutting each other.

3. An agricultural forager provided with chopping means within a housing having an open forward end, in combination with a header constructed and arranged to be connected firmly and detachably to the forward end of said forager and extend forwardly therefrom, the rearward end of said header and forward end of said forager housing having laterally extending flanges comprising complementary face portions arranged to abut each other when connected, interengageable guide pins connected to certain of said complementary face portions and received in holes provided in certain other of said face portions to prevent relative transverse movement of said header and housing when connected, interengageable cam and cam engageable means on opposite sides of said header and housing operable to center said header in both vertical and horizontal directions relative to said forward end of said housing when said header is moved rearwardly toward said housing to connect the same thereto, and quickly disengageable connecting means on said header and housing operable to hold the same connected together when centered and abutting each other and maintains side guide pins within said holes therefor.

4. An agricultural forager provided with chopping means within a housing having an open forward end, in combination with a header constructed and arranged to be connected firmly and detachably to the forward end of said forager and extend forwardly therefrom, the rearward end of said header and forward end of said forager housing having complementary face portions arranged to abut each other when connected, interengageable cam and cam engageable means on opposite sides of said header and housing operable to center said header in both horizontal and vertical directions relative to said forward end of said housing when said header is moved rearwardly toward said housing to connect the same thereto, relatively short guide pins mounted on one of said face portions and received within holes formed in the other face portion to prevent relative transverse movement of said header and housing when connected, said cam means being positioned in advance of said pins to center said header and housing prior to the engagement of said short guide pins with the holes therefor, and quickly disengageable connecting means on said header and housing operable to hold the same connected together when centered and abutting each other and maintain said guide pins within said holes therefor.

5. An agricultural forager provided with chopping means within a housing having an open forward end, in combination with a header constructed and arranged to be connected firmly and detachably to the forward end of said forager and extend forwardly therefrom, the rearward end of said header and forward end of said forager housing having complementary face portions comprising laterally projecting flanges arranged to abut each other when connected, interengageable cam and cam engaging means on said header and housing operable to center said header in both horizontal and vertical directions relative to said forward end of said housing when said header is moved rearwardly toward said housing to connect the same thereto, guide pins having tapered outer ends projecting from the flanges of one of said face portions and received within holes formed in the flanges of the other face portion to prevent relative transverse movement of said header and housing when said flanges abut each other, and quickly disengageable connecting means on said header and housing operable to effect final drawing of the header into engagement with said housing and hold the same connected together when centered and abutting each other.

6. An agricultural forager provided with forage chopping means enclosed within a housing having an open forward end, in combination with a header constructed and arranged to be connected firmly and detachably to the forward end of said forager and extend forwardly therefrom, the rearward end of said header and forward end of said forager housing having complementary face portions arranged to abut each other when connected and also having horizontally extending and relatively overlying face portions slidably engageable and operable to support the rear end of said header in a vertical direction upon said housing while said header is being centered relative to said housing and moved into abutment therewith, cam means on said header and housing operable to center said header relative to the forward end of said housing in a transverse direction when said header is being moved rearwardly toward said housing to connect the same thereto, and quickly disengageable connecting means on said header and housing operable to hold the same connected together when centered and abutting each other.

7. An agricultural forager provided with forage chopping means enclosed within a housing having an open forward end, in combination with a header constructed and arranged to be connected firmly and detachably to the forward end of said forager and extend forwardly therefrom, the rearward end of said header and forward end of said forager housing having complementary substantially vertical face portions arranged to abut each other when connected and also having horizontally extending and relatively overlying face portions slidably engageable and operable to support the rear end of said header in a vertical direction while said header is being centered relative to said housing and moved into abutment therewith, cam means on the outer ends of said horizontally extending portions of said header and housing interengageable to facilitate initial positioning of said header in a vertical direction relative to said housing, additional cam and cam engaging means on said header and housing operable to center said header relative to the forward end of said housing in a horizontal direction when said header is being moved rearwardly toward said housing to connect the same thereto, and quickly disengageable connecting means on said header and housing operable to hold the same connected together when centered and abutting each other.

8. An agricultural forager provided with forage chopping means enclosed within a housing having an open forward end, in combination with a header constructed and arranged to be connected firmly and detachably to the forward end of said forager and extend forwardly therefrom, the rearward end of said header and forward end of said forager housing having complementary substantially vertical face portions arranged to abut each other when connected, and cam engaging means on said header and housing operable to center said header in both horizontal and vertical directions relative to the forward end of said housing when said header is being moved rearwardly toward said housing to connect the same thereto, hook-like means on said header and housing, and pivotally mounted toggle connecting means on said header and housing movable longitudinally thereof and engageable with said hook-like means and operable to effect drawing of said header into engagement with said housing and cause the interengagement of said cam and cam engaging means to effect centering of said header relative to said housing, whereby connection of said header and housing is effected when the same abut each other.

9. An agricultural forager provided with forage chopping means enclosed within a housing having an open forward end, in combination with a header constructed and arranged to be connected firmly and detachably to the forward end of said forager and extend forwardly therefrom, the rearward end of said header and forward end of said forager housing having substantially vertical and complementary face portions arranged to abut each other when connected, cam means on said header and housing interengageable and operable to center said header vertically relative to the forward end of said housing when said header is being moved rearwardly toward said housing to connect the same thereto, hook-like means on said header and housing, the hook-like means on said header being at opposite sides thereof and having cam means thereon engageable with opposite sides of said housing and operable to center said header horizontally thereto when said header is moved rearwardly toward said housing, and quickly disengageable toggle connecting means on said header and housing engageable with said hook-like means and movable longitudinally to connect said header and housing together when the same are centered and abutting each other.

10. An agricultural forager provided with forage chopping means enclosed within a housing having an open forward end, in combination with a header constructed and arranged to be connected operatively to the forward end of said forager and extend forwardly therefrom, the rearward end of said header and forward end of said forager housing having substantially vertical complementary face portions arranged to abut each other when connected and said header also having a horizontal plate extending rearwardly and overlying the top of the forward end of said housing when said header is moved into abutment with said housing, cam and cam engaging means on said header and housing operable to center said header both transversely and vertically relative to the forward end of said housing when said header is being moved rearwardly toward said housing to connect the same thereto, hook-like means on said housing, and quickly disengageable toggle connecting means on said horizontal plate on said header engageable with said hook-like means on said housing and movable longitudinally of said header to draw said header into abutment with said housing and connect the same together while said cam and cam engaging means operate to center the same when abutting each other.

References Cited in the file of this patent

UNITED STATES PATENTS

| 2,489,112 | Talbert | Nov. 22, 1949 |
| 2,728,180 | Whisler | Dec. 27, 1955 |
| 2,763,115 | Skromme | Sept. 18, 1956 |

OTHER REFERENCES

International Harvester, McCormick 20-C, Field Harvester Bulletin, pages 2 and 8, CR 147-B.